(12) United States Patent
Cho et al.

(10) Patent No.: US 10,216,319 B2
(45) Date of Patent: Feb. 26, 2019

(54) DISPLAY DEVICE HAVING TOUCH SENSOR

(71) Applicant: LG Display Co., Ltd., Seoul (KR)

(72) Inventors: Seungwan Cho, Yangju-si (KR); Byeongseong So, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 94 days.

(21) Appl. No.: 15/295,838

(22) Filed: Oct. 17, 2016

(65) Prior Publication Data

US 2017/0115808 A1    Apr. 27, 2017

(30) Foreign Application Priority Data

Oct. 27, 2015  (KR) .................. 10-2015-0149796

(51) Int. Cl.
*G06F 3/041* (2006.01)
*G09G 3/36* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G09G 3/3677* (2013.01); *G06F 2203/04108* (2013.01); *G09G 2300/043* (2013.01); *G09G 2300/0819* (2013.01); *G09G 2310/0286* (2013.01)

(58) Field of Classification Search
CPC ...... G06F 3/044; G06F 3/0416; G06F 3/0412; G06F 3/041; G09G 3/3677
See application file for complete search history.

(56) References Cited

U.S. PATENT DOCUMENTS

| | | | |
|---|---|---|---|
| 2014/0049508 A1* | 2/2014 | Kim ..................... | G06F 3/044 345/174 |
| 2015/0355767 A1* | 12/2015 | Abe ..................... | G06F 3/0412 345/174 |
| 2016/0274713 A1* | 9/2016 | Zhang ................. | G06F 3/041 |

* cited by examiner

*Primary Examiner* — Towfiq Elahi
(74) *Attorney, Agent, or Firm* — Fenwick & West LLP

(57) ABSTRACT

A display device includes a display panel including a display driving circuit, and a touch sensing circuit. The display panel includes first and second panel blocks, each including pixel arrays including touch sensors. The display driving circuit includes a shift register for sequentially outputting a gate pulse applied to a gate line. The shift register includes first and second shift registers and a compensation stage. The first shift register applies a gate pulse to gate lines arranged in the first panel block, and the second shift register applies a gate pulse to gate lines arranged in the second panel block during at least a portion of the display period when a node of the second shift register is charged to a predetermined level. The compensation stage charges the node of the second shift register upon receiving a bridge clock during a touch sensing period of the first panel block.

16 Claims, 15 Drawing Sheets

DISPLAY DEVICE HAVING TOUCH SENSOR

CROSS REFERENCE TO RELATED APPLICATIONS

This application claims the priority under 35 U.S.C. 119(a) of Republic of Korea Patent Application No. 10-2015-0149796 filed on Oct. 27, 2015, which is hereby incorporated by reference in its entirety.

BACKGROUND

Field

The present disclosure relates to a display device having a touch sensor.

Discussion of the Related Art

Development of multimedia has led to an increase in demand of display devices able to appropriately display the multimedia. In order to meet the increase in demand, flat display devices (or display devices) which are increased in size and low-priced, and have high display quality (video expression, resolution, brightness, contrast, and color reproducibility, and the like) have been actively developed. In these flat display devices, various input devices such as a keyboard, a mouse, a track ball, a joystick, a digitizer, and the like, are used to form an interface between users and the flat display devices. However, the use of the aforementioned input devices requires users to learn how to use the input devices and inconveniences as the users with installation of the input devices and occupation of the input devices of an operation space, making it difficult to increase completeness of products. Thus, demand for input devices which are convenient to use, simple, and reduce malfunction has grown. In order to meet the demand, touch sensors capable of recognizing information generated as users directly touch a screen with their hands or a pen or apply a touch in a proximity manner, while viewing a display device, has been proposed.

A touch sensor used in a display device may also be implemented in an in-cell type touch sensor installed within a display panel. An in-cell type display device may employ a scheme in which a touch electrode of a touch sensor and a common electrode of a display panel are shared and driving is performed by time division of a display period and a touch sensing period. In particular, a display panel may be divided into a first block PB1 and a second block PB2 as illustrated in Figure (FIG. 1, and display driving and touch sensing driving may be performed in units of the divided blocks. For example, after data of an input image is written into pixels of the first block PB1 during a first display period Td1, touch sensors are driven to sense a touch input during a first touch sensing period Tt1. Subsequently, after data of an input image is written into pixels of the second block PB2 during a second display period Td2, touch sensors are driven to sense a touch input during the second touch sensing period Tt2.

During the display period, a gate driver sequentially shifts a gate pulse applied to gate lines using a shift register. A gate pulse is synchronized with the data signal of the input image and sequentially selects pixels in which the data signal is to be charged, one line each time. The shift register of the gate driver includes dependently connected stages. The stages of the shift register are dependently connected to receive a start pulse and/or an output of a previous stage to charge a node (e.g., a Q node). When the display period is not divided but continuous, node charge periods (e.g., Q node charge periods) (hereinafter, referred to as "a standby period") of all the stages of the shift register are the same as approximately 2 horizontal periods.

However, when the display period is divided in units of the blocks (e.g., Td1 and Td2) as illustrated in FIG. 2, and a touch sensing period is allocated there between (e.g., Tt1 and Tt2), and a Q node of a stage generating a first output immediately after the touch sensing period is decayed by the touch sensing period to generate a low output. In case of full high definition (FHD), 1 horizontal period is approximately 6.0 μs and a touch sensing period is 100 μs or longer. Thus, a standby period of a stage generating a first output immediately after the touch sensing period is 100 μs or longer, while a standby period of other stages is about 12.0 μs. Since the standby period is lengthened, a decay time of a node is lengthened, causing a line dim phenomenon at a first line from which the display period starts again immediately after the touch sensing period.

SUMMARY

A display device according to the present disclosure includes a display panel, a display driving circuit, and a touch sensing circuit. The display panel includes first and second panel blocks, and the first and second panel blocks include pixel arrays including touch sensors. The display driving circuit writes image data to pixels of the first panel block during a first display period and writes image data to pixels of the second panel block during a second display period. The touch sensing circuit drives the touch sensors of the first panel block during a first touch sensing period and drives the touch sensors of the second panel block during a second touch sensing period. The display driving circuit includes a shift register sequentially outputting a gate pulse applied to a gate line. The shift register includes first and second shift registers and a compensation circuit stage.

The first shift register applies a gate pulse to first gate lines arranged in the first panel block. The second shift register applies a gate pulse to second gate lines arranged in the second panel block. The second shift register applies the gate pulse to a gate line of the second gate lines during at least a portion of the second display period when a node of the second shift register is charged to a predetermined level. The compensation circuit stage receives a bridge clock and charges the node of the second shift register responsive to the bridge clock during the first touch sensing period of the first panel block.

A touch sensitive display device includes a display panel and a shift register. The display panel is driven in a first display period, a second display period, and a touch sensing period between the first display period and the second display period. The display panel includes a first plurality of gate lines and a second plurality of gate lines. The shift register drives the first plurality of gates lines and the second plurality of gate lines. The shift register includes a first shift register, a second shift register, and a compensation circuit. The first shift register sequentially applies a pulse to the plurality of first gate lines of the display panel during the first display period. The second shift register sequentially applies a gate pulse to the plurality of second gate lines of the display panel during the second display period responsive to a node of the second shift register being charged to a predetermined level. The compensation circuit charges the node of the second shift register during the touch sensing period between the first display period and the second display period and in response to a signal from the first shift register.

In one embodiment, the compensation circuit maintains a voltage of the node of the second shift register during the touch sensing period.

In one embodiment, the first shift register includes first through Kth stages and the second shift register includes (K+1)th through 2Kth stages, where K is a natural number. Each of the first through 2Kth stages includes a pull-up transistor and a start control transistor. The pull-up transistor includes a gate electrode connected to a node, an electrode connected to a gate clock input terminal, and an electrode connected to a gate pulse output terminal. The start control transistor includes a gate electrode connected to a start signal input terminal, an electrode connected to a high potential voltage input terminal, and an electrode connected to the node.

In one embodiment, the compensation circuit charges the node of the second shift register in response to a signal from the first shift register by charging the node of the (K+1)th stage of the second shift register responsive to a charge at the node of the Kth stage of the first shift register. In some configurations, the compensation circuit includes a compensation transistor including a gate electrode connected to the node of the Kth stage of the first shift register, an electrode receiving a clock signal, and an electrode connected to the start control transistor of the (K+1)th stage of the second shift register.

In one embodiment, the compensation circuit charges the node of the second shift register in response to a signal from the first shift register by charging the node of the (K+1)th stage of the second shift register responsive to the gate pulse of the Kth stage of the first shift register. In some configurations, the compensation circuit includes a first transistor and a second transistor. The first transistor includes a gate electrode connected to the gate pulse output terminal of the Kth stage of the first shift register, an electrode connected to a high potential voltage input terminal, and an electrode connected to a bridge node. The second transistor includes a gate electrode connected to the bridge node, an electrode receiving a clock signal, and an electrode connected to the start control transistor of the (K+1)th stage of the second shift register.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Figure 1:
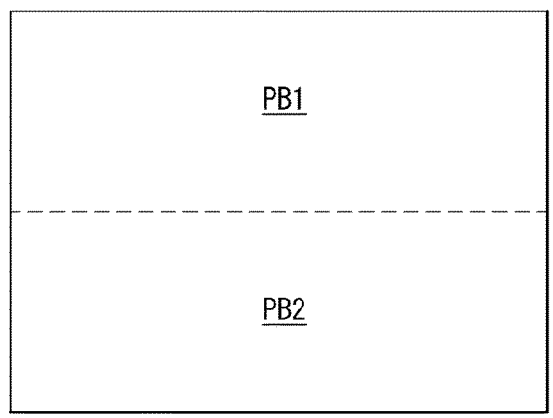
FIGS. 1 and 2 are views illustrating a display and a method for sensing a touch in units of panel blocks.
Figure 2:
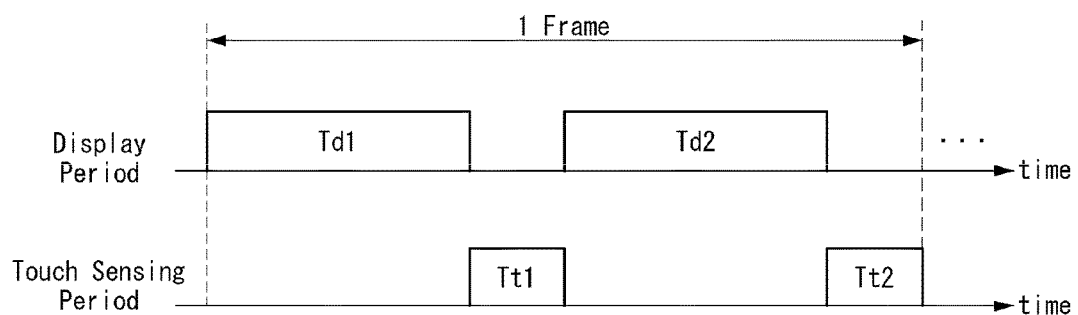

Hereinafter, embodiments of the present disclosure will be described in detail with reference to the accompanying drawings. Like reference numerals refer to like elements throughout. In describing the present disclosure, if a detailed explanation for a related known function or construction is considered to unnecessarily divert the gist of the present invention, such explanation will be omitted but would be understood by those skilled in the art. Also, names of elements used in the following description are selected for the description purpose and may be different from those of actual products.

Figure 3:
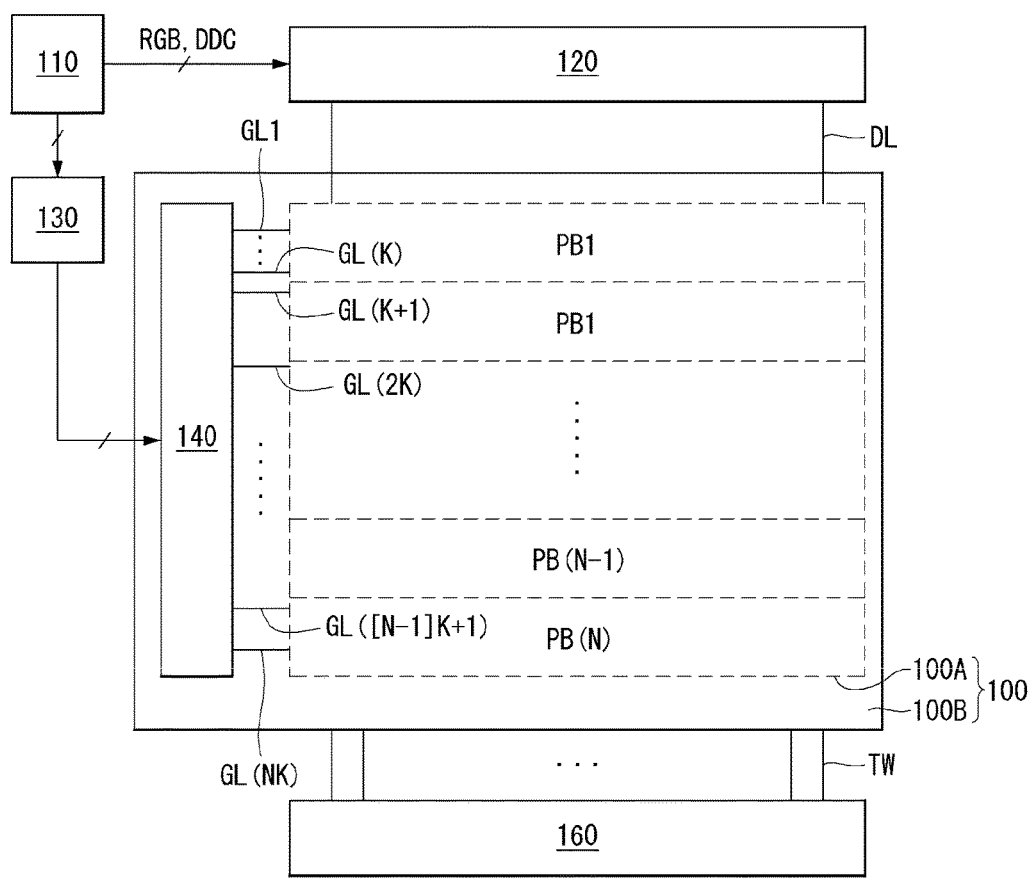
FIG. 3 is a view illustrating a display device, according to one embodiment.
Figure 4:
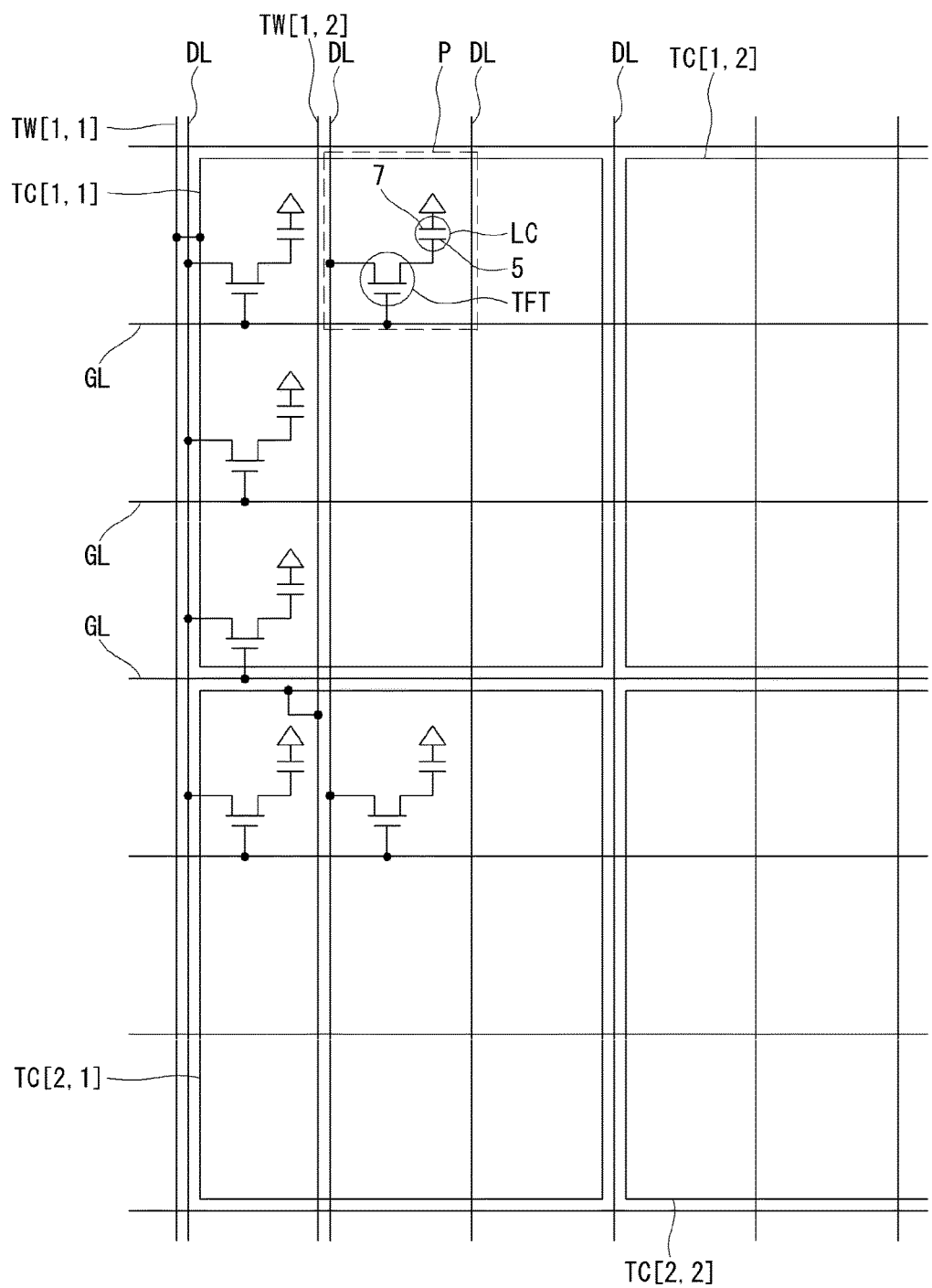
FIG. 4 is a view illustrating a pixel structure, according to one embodiment.
Figure 5:
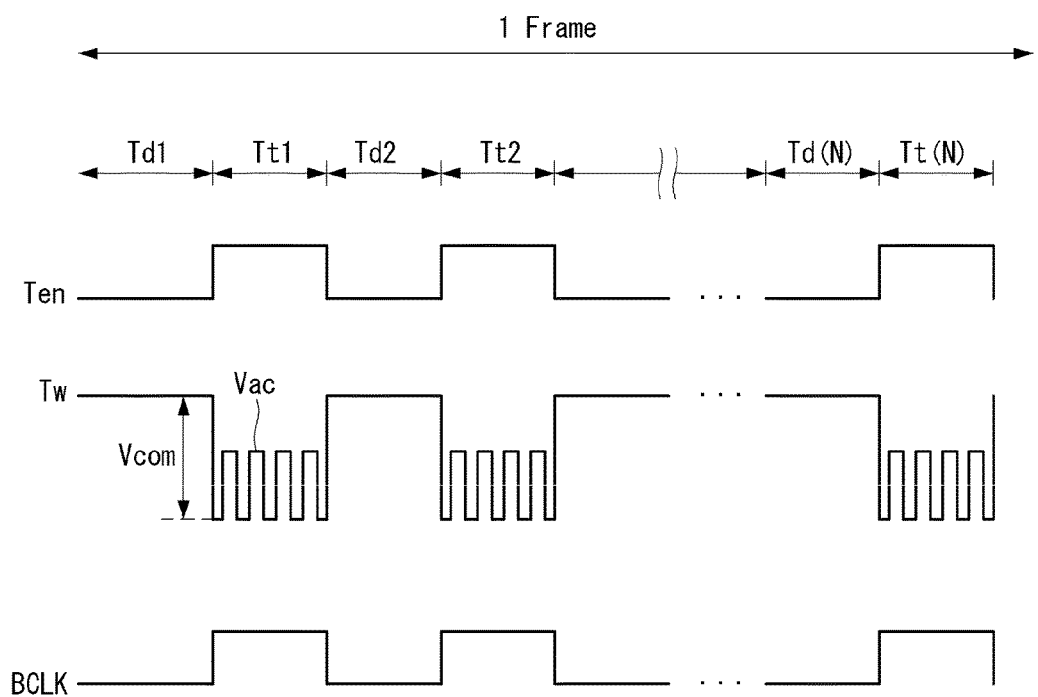
FIG. 5 is a view illustrating a driving signal, according to a first embodiment.

FIG. 3 is a view illustrating a display device including a touch sensor, according to one embodiment, and FIG. 4 is a view illustrating a pixel structure. FIG. 5 is a view illustrating signals output by a driving circuit unit to signal lines. In FIGS. 3 and 4, touch sensors and sensing lines are denoted by separate reference numerals but will be referred to as a "touch sensor TC and a sensing line TW" when generally described without distinguishing positions of each component in detailed descriptions.

Referring to FIGS. 3 through 5, a display device including a touch sensor includes a display panel 100, a timing controller 110, a data driving circuit 120, a level shifter 130, a shift register 140, and a touch sensing circuit 160. The level shifter 130 and the shift register 140 may be collectively referred to as gate driving circuit 130/140.

The display panel 100 includes a display part 100A and a non-display part 100B. Pixels P for displaying image information and touch sensors TC are disposed in the display part 100A. The non-display part 100B is disposed outside of the display part 100A.

The display part 100A is divided into N number of panel blocks PB1 through PB(N). An image is displayed and touch sensing is performed in units of panel blocks PB (i.e., per panel block PB). Each of the panel blocks PB1 through PB(N) includes k (e.g., where k is a natural number) number of horizontal lines HL. That is, a first panel block PB1 includes 1 through K gate lines GL1 to GL(K).

A pixel array of the display panel 100 includes data lines DL, gate lines GL, a thin film transistor (TFT) formed at an intersection between the data lines DL and the gate lines GL, a pixel electrode 5 connected to the TFT, a storage capacitor Cst connected to the pixel electrode 5, and the like. The TFT is turned on in response to a gate pulse from the gate line GL to supply a data voltage applied through the data line DL to the pixel electrode 5. A liquid crystal layer LC is driven by a voltage difference between a data voltage charged in the pixel electrode 5 and a common voltage Vcom applied to a touch common electrode 7 to adjust a quantity of transmission light.

A touch sensor TC is connected to a plurality of pixels and implemented as a capacitive touch sensor to sense a touch input. The touch sensors are divided into a first touch group T_G1 and a second touch group T_G2. The first touch group T_G1 includes touch sensors of a first column to touch sensors TC[1,N] of an Nth column, and the second touch group T_G2 includes touch sensors TC[N+1,1] of an (N+1)th column to touch sensors TC[2N,1] of an 2Nth column. Each of the touch sensors TC may include a plurality of pixels P. FIG. 4 illustrates a case in which nine pixels P arranged in a 3×3 matrix form are allocated to a single touch sensor TC. The touch common electrode 7 is divided in units of touch sensors TC, and resultantly, an area occupied by the touch common electrode 7 may be designated as the touch sensor TC. Each of the touch sensors TC are allocated on a sensing line TW and connected thereto. For example, a sensing line TW[1,1] is connected to a touch sensor TC[1,1] of the first row and first column, and a sensing line TW[1,2] is connected to a touch sensor TC[1,2] of the second row and first column.

The common electrode 7 receives a common voltage Vcom, a reference voltage of pixels, during a display period, and receives a touch sensing signal Vac during a touch sensing period.

The non-display part 100B is disposed outside of the display part 100A. A display driving circuit for driving the data line DL and the gate line GL is disposed in the non-display part 100B.

The display driving circuit includes the data driving circuit 120 and the gate driving circuit 130/140 and writes data of an input image to the pixels P of the display panel 100. The display driving circuit performs time division on a first frame period dividing the first frame period into one or more display periods and one or more touch sensing periods, and writes data of an input image to the pixels in units of blocks during the one or more display periods. As illustrated in FIG. 5, 1 frame includes N number of display periods Td1 through Td(N) and N number of touch sensing periods Tt1 through Tt(N). The display periods Td and the touch sensing periods Tt are alternated. During a first display period Td1, image data is written into the first panel block PB1. During a first touch sensing period Tt1, touch sensors of the first panel block PB1 are driven.

The data driving circuit 120 receives image data from the timing controller 110 and converts the image data into a positive polarity/negative polarity gamma compensation voltage to output a positive polarity/negative polarity data voltage. The data voltage is supplied to the data lines DL.

The gate driving circuit 130/140 sequentially supplies a gate pulse to the gate lines GL under the control of the timing controller 110. The gate pulse output from the gate driving circuit 130/140 is synchronized with the data voltage. The gate driving circuit 130/140 includes the level shifter 130 and the gate shift register 140 connected between the timing controller 110 and the scan lines of the display panel 100. The level shifter 130 level-shifts a transistor-transistor-logic (TTL) level voltage of gate clocks CLK input from the timing controller 110 to a gate high voltage VGH and a gate low voltage VGL. The gate shift register 140 includes stages to shift a start signal VST according to a gate clock CLK to sequentially output a gate pulse Gout.

The timing controller 110 transmits data of an input image received from a host system (not shown) to the data driving circuit 120. Using timing signals such as a vertical synchronization signal Vsync, a horizontal synchronization signal Hsync, a data enable signal DE, a main clock MCLK, and the like, received from the host system in synchronization with the data of the input image, the timing controller 110 outputs a data timing control signal for controlling an operation timing of the data driving circuit 120 and a gate timing control signal for controlling an operation timing of the gate driving circuit 130/140. The timing controller 110 synchronizes the display driving circuit 120 and the touch sensing circuit 160.

In response to a touch enable signal Ten input from the timing controller 110 or the host system, the touch sensing circuit 160 drives touch sensors during the touch sensing period Tt. The touch sensing circuit 160 senses a touch input by supplying a touch driving signal Vac to the touch sensors TC through the sensing lines TW during the touch sensing period Tt. The touch sensing circuit 160 determines a touch input by analyzing a variation in charges of a touch sensor varied according to presence and absence of a touch input, and calculates coordinates of a touch input position. The coordinate information of the touch input position is transmitted to the host system.

Figure 6:
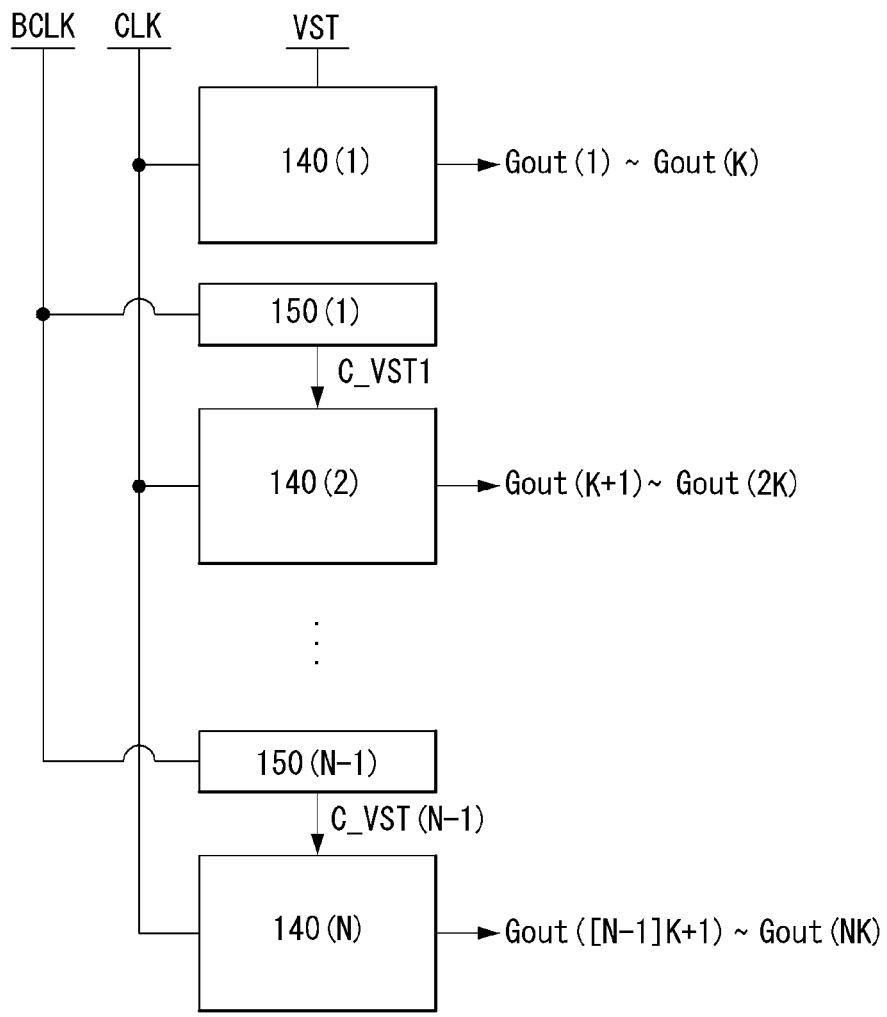
FIG. 6 is a view illustrating a configuration of shift registers and compensation stages, according to one embodiment.
Figure 7:
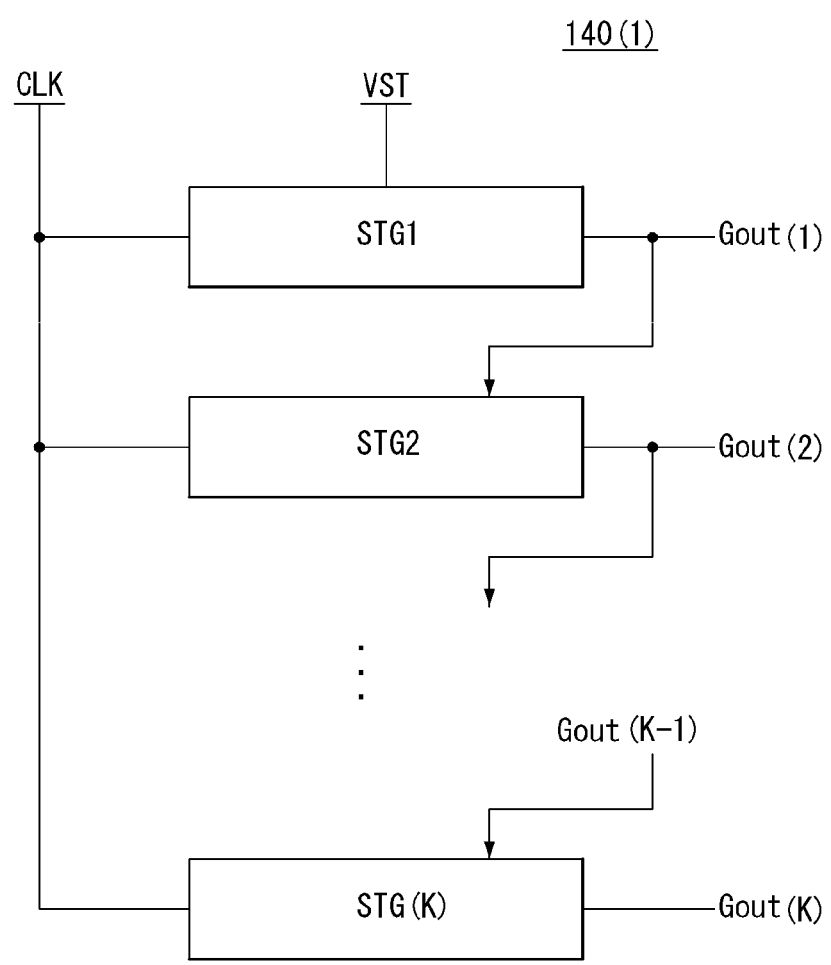
FIG. 7 is a view illustrating stages of a first shift register, according to one embodiment.

FIG. 6 is a view illustrating a configuration of shift registers and compensation stages, according to one embodiment, and FIG. 7 is a view illustrating stages of a first shift register of FIG. 6, according to one embodiment. In the following descriptions, a "previous stage" refers to a stage positioned above a reference stage. For example, with respect to an ith (e.g., where i is a natural number smaller than N×k) stage STGi, a previous stage designates any one of a first stage STG1 to (i−1)th stage STG(i−1). A "subsequent stage" refers to a stage below the reference stage. For example, with respect to the ith (e.g., where i is a natural number) stage STGi, a subsequent stage designates any one of (i+1)th stage STG(i+1) to Kth stage STG(K).

Referring to FIGS. 6 and 7, the shift register includes first through N shift registers 140(1) through 140(N), respectively, and first through (N−1)th compensation circuit stages 150(1) through 150(N−1), respectively.

A jth (e.g., where j is a natural number smaller than N) shift register 140(j) applies a gate pulse to gate lines belonging to a jth panel block PBj. The first through Nth shift registers 140(1) through 140(N), respectively, each include k number of stages for outputting k number of gate pulses. For example, the first shift register 140(1) includes first through Kth stages STG(1) to STG(K).

In the first shift register 140(1), output signals of the first through (K−1)th stages STG1 through STG(K−1), respectively, are carry signals applied to a subsequent stage. For example, a first gate pulse Gout(1) is applied to a second stage STG2 and a (K−1)th gate pulse Gout(K−1) is applied to a Kth stage STG(K).

Compensation circuit stages 150(1) through 150(N−1) each are positioned between first through N shift registers 140(1) through 140(N) and output compensation start signals C_VST1 through C_VST(N−1), respectively. Each of the compensation start signals C_VST1 through C_VST(N−1) is applied to a start control transistor Tvst of a first stage of a subsequent shift register. For example, a first compensation circuit stage 150(1) outputs a first compensation start signal C_VST1, and the first compensation start signal C_VST1 is applied to a first stage STG1 of the second shift register 140(2).

Figure 8:
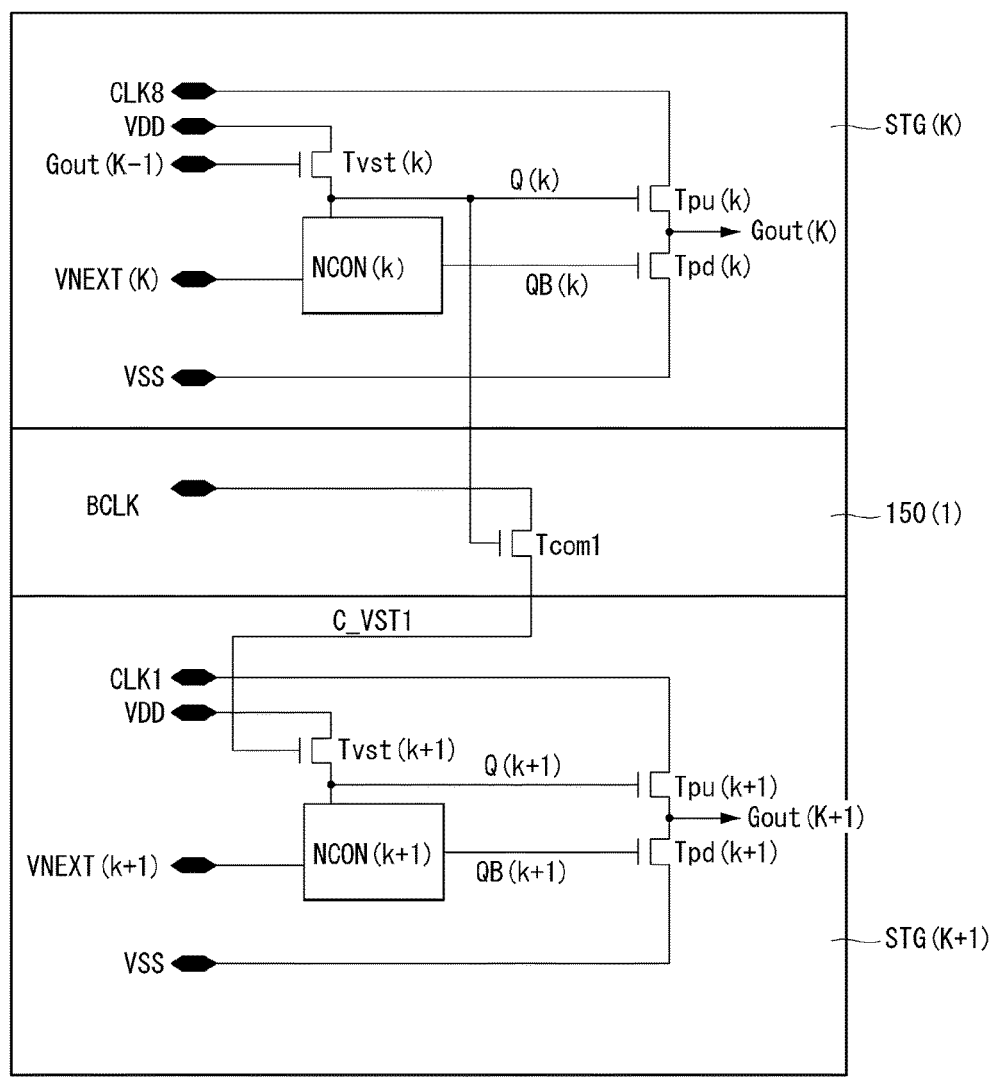
FIG. 8 is a view illustrating shift registers and a compensation stage, according to the first embodiment.

FIG. 8 is a view illustrating a detailed configuration of shift registers and a compensation stage, according to a first embodiment. The first embodiment is described on the basis of a gate clock having 8 phases, but the present disclosure is not limited thereto. Also, in the first embodiment, a gate clock input to each stage may be varied according to the number of gate lines included in each shift register. FIG. 8 illustrates a Kth stage STG(K), a final stage of the first shift register 140(1), a (K+1)th stage STG(K+1), a first stage of a second shift register 140(2), and a first compensation circuit stage 150(1).

The Kth stage STG(K) includes a pull-up transistor Tpu(k), a pull-down transistor Tpd(k), a start control transistor Tvst(k), and a node control circuit NCON(k).

The pull-up transistor Tpu(k) outputs an eight gate clock CLK8 according to a voltage of a Q node Q(k). The pull-down transistor Tpd(k) discharges a voltage of an output terminal Gout(K) to a low potential voltage VSS when a QB node QB(k) is charged. The start control transistor Tvst(k) is turned on upon receiving gate pulse Gout(K−1), an output from a previous stage, to charge the Q node Q(k). In response to a subsequent stage signal VNEXT(K), the node control circuit NCON(k) controls voltages of the Q node Q(k) and the QB node QB(k). A detailed configuration of the node control circuit NCON(k) may be any known configuration. A gate pulse (e.g., Gout(K)) is supplied to a corresponding gate line during at least a portion of a display period (e.g., kH) when the Q node is charged to a predetermined level (e.g., VDD). In one embodiment, the Q node may also be referred to as a transistor control node.

The first compensation circuit stage 150(1) includes a compensation transistor Tcom with a gate electrode connected to the Q node Q(k) of the Kth stage STG(K), a source electrode connected to a start control transistor Tvst(k+1) of a (K+1)th stage STG(K+1), and a drain electrode connected to a bridge clock BCLK. The first compensation circuit stage 150(1) operates when the bridge clock BCLK has a turn-on voltage, to output a first compensation start signal C_VST1 corresponding to the Q node Q(k) voltage. The first compensation start signal C_VST1 output by the first compensation circuit stage 150(1) is applied to a start control transistor Tvst(k+1).

Figure 9:
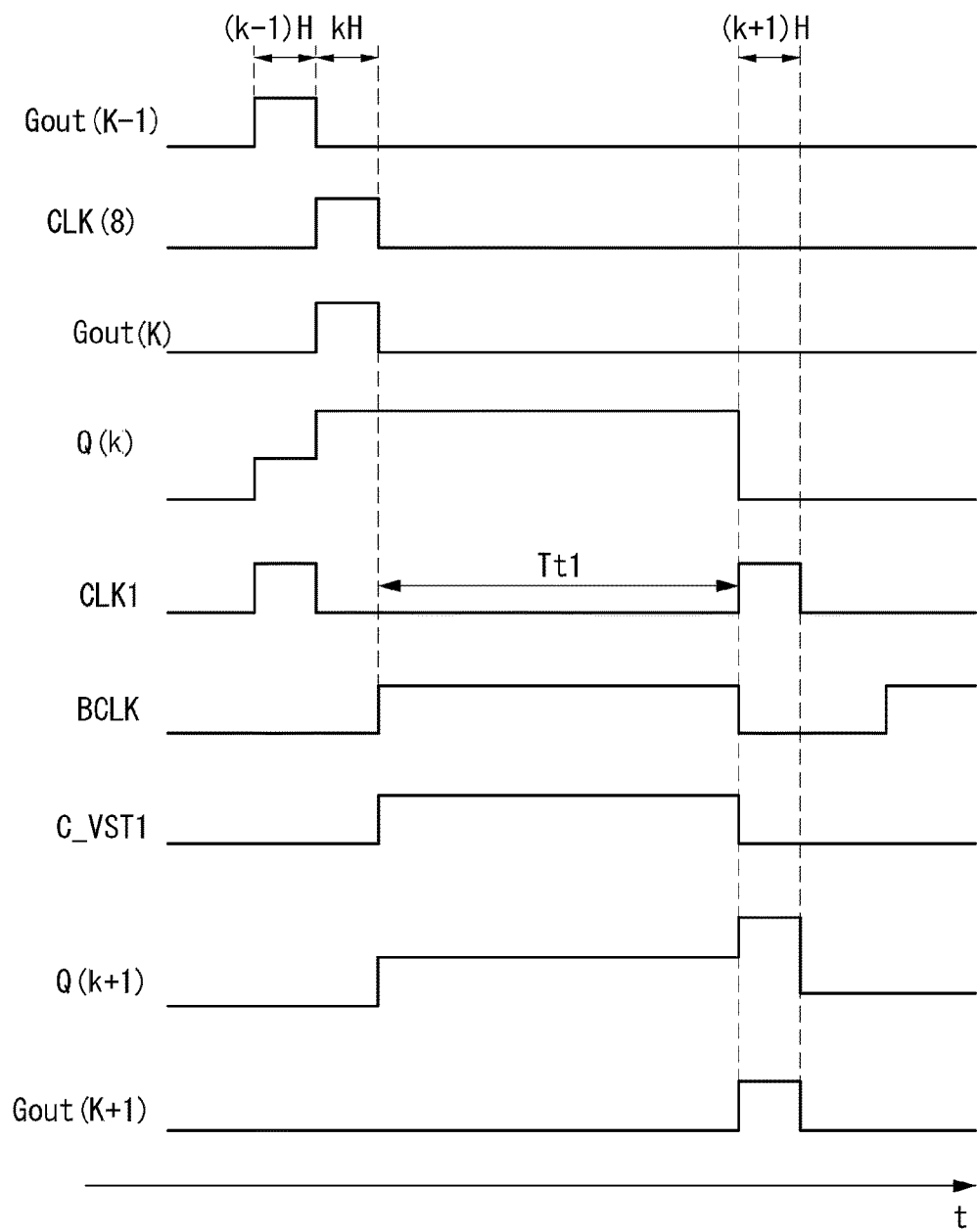
FIG. 9 is a timing diagram illustrating output signals of stages illustrated in FIG. 8, according to one embodiment.

FIG. 9 is a timing diagram illustrating changes in voltage of control signals and major nodes. In FIG. 9, a kth horizontal period kH designates a section in which a kth gate line is output.

Operations of the stages illustrated in FIG. 8 will be described with reference to FIG. 9.

During a (k−1)th horizontal period (k−1)H, the start control transistor Tvst(k) of the Kth stage STG(K) is turned on in response to a gate pulse Gout(K−1), to pre-charge the Q node Q(k) with a high potential voltage VDD.

During the kth horizontal period kH, the pull-up transistor Tpu(k) of the Kth stage STG(K) receives an eighth gate clock CLK8. The Q node Q(k), a gate electrode of the pull-up transistor Tpu(k), is bootstrapped by the eight gate clock CLK8 applied in a state in which the Q node Q(k) is pre-charged. When a gate-source potential of the pull-up transistor Tpu(k) reaches a threshold voltage Vth in a process in which the Q node Q(k) is bootstrapped, the pull-up transistor Tpu(k) is turned on. As a result, a gate pulse Gout(K) corresponding to a high level voltage of the eighth gate clock CLK8 is output.

After the Kth gate pulse Gout(K) is output, the first touch sensing period Tt1 during which the first panel block PB1 region is touch-driven continues as illustrated in FIG. 5.

As illustrated in FIG. 5, the bridge clock BCLK maintains a high level DC voltage during the touch sensing period Tt1. As a result, the Q node Q(k) is maintained in the bootstrapped state by the bridge clock BCLK applied to the drain electrode of the compensation transistor Tcom1 during the first touch sensing period Tt1. That is, during the first touch sensing period Tt1, the first compensation circuit stage 150(1) outputs the first compensation start signal C_VST1 having a high level voltage.

The first compensation start signal C_VST1 is applied to the start control transistor Tvst(k+1). In response to the first compensation start signal C_VST1, the start control transistor Tvst(k+1) charges the Q node Q(k+1). As a result, even during the first touch sensing period Tt1, the Q node Q(k+1) maintains the high level voltage. In some embodiments, the start control transistor Tvst(k+1) may be logically considered to be part of the first compensation circuit stage 150(1).

During the (k+l)th horizontal period (k+1)H, the (K+1)th stage STG(K+1) outputs a (k+l)th gate pulse Gout(K+1) in response to the first gate clock CLK1. In some embodiments, during the (k+l)th horizontal period (k+1)H, the (K+1)th stage STG(K+1) outputs a (k+l)th gate pulse Gout(K+1) to a gate line responsive to the Q node Q(k+1) being charged to a predetermined level (e.g., VDD).

As discussed above, since the start control transistor Tvst(k+1) starts based on the first compensation start signal C_VST1, it may be able to charge the Q node Q(k+1) during the first touch sensing period Tt1. That is, since the voltage of the Q node Q(k+1) is not discharged even during the first touch sensing period Tt1, the (k+1)th gate pulse Gout(K+1) may be output in response to the first clock signal CKL1.

Figure 10:
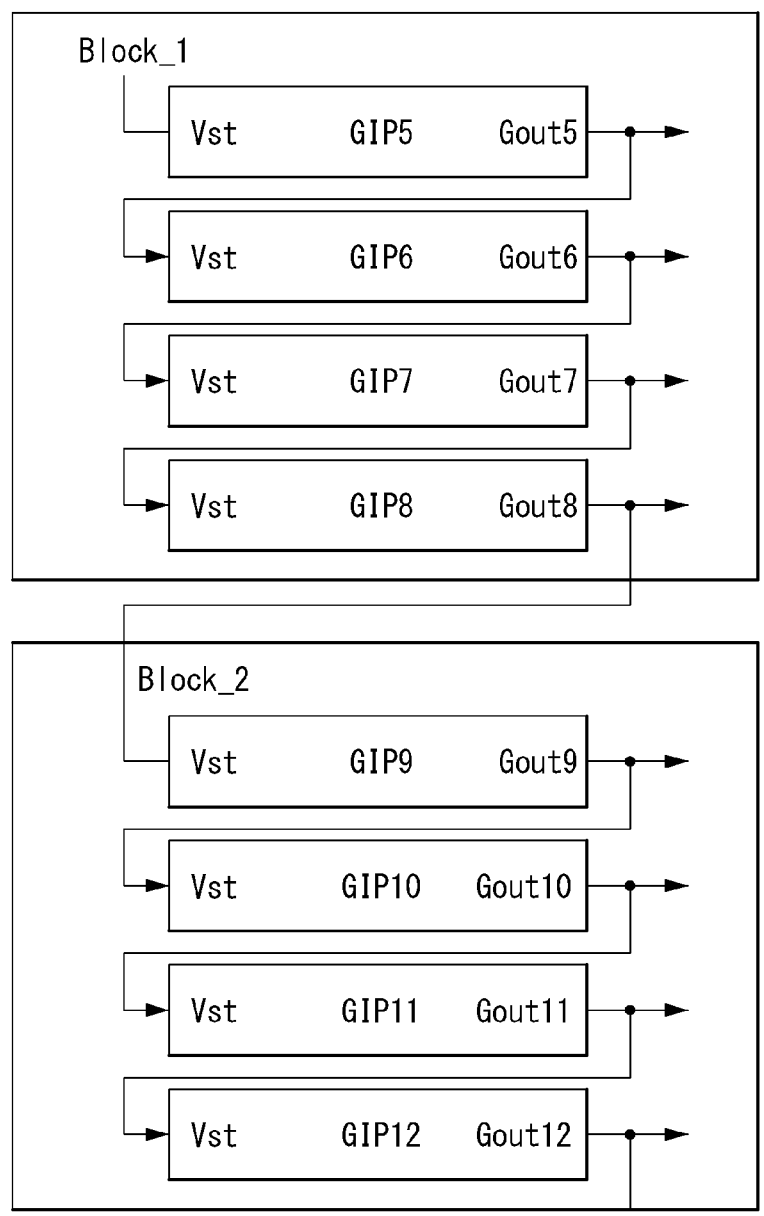
FIG. 10 is a view illustrating a shift register, according to a comparative example.
Figure 11:
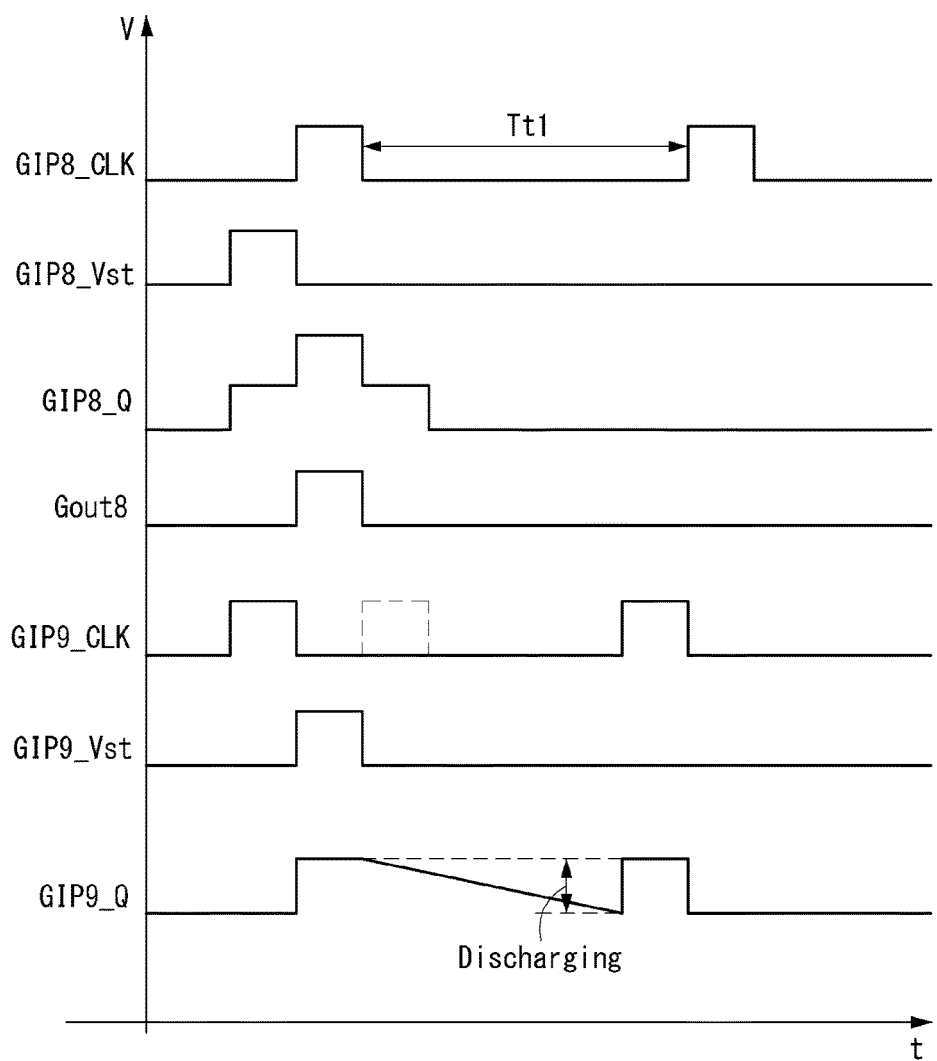
FIG. 11 is a timing diagram illustrating output signals of the shift register illustrated in FIG. 10, according to one embodiment.

FIG. 10 is a view illustrating a configuration of a shift register according to a comparative example, and FIG. 11 is a timing diagram of the stages illustrated in FIG. 10.

Referring to FIGS. 10 and 11, the stages of the comparative example receive an output from a previous stage as a start signal Vst, and output a gate pulse Gout. A first touch sensing period Tt1 exists between a period in which a first shift register Block_1 is driven and a period in which a second shift register Block_2 is driven.

A ninth stage GIP9 receives an output from an eighth stage GIPS, as a start signal GIP_VST, and charges a Q node GIP9_Q. Also, when a gate clock GIP9_CLK is input, the ninth stage GIP9 outputs a ninth gate pulse Gout9. After the Q node GIP9_Q is charged and when the first touch sensing period Tt1 has lapsed, the ninth stage GIP9 receives the gate clock GIP9_CLK. As a result, the Q node GIP9 _Q of the ninth stage GIP9 is discharged during the first touch sensing period Tt1, and thus, even though the gate clock GIP9_CLK is received, bootstrapping is not smoothly performed and the gate pulse Gout9 may not be output.

In contrast, in the display device according to the first embodiment, since the Q node Q of a first stage of the shift register is charged even during the touch sensing period Tt, a phenomenon in which a gate pulse is not output due to discharge of the Q node Q may be improved.

Figure 12:
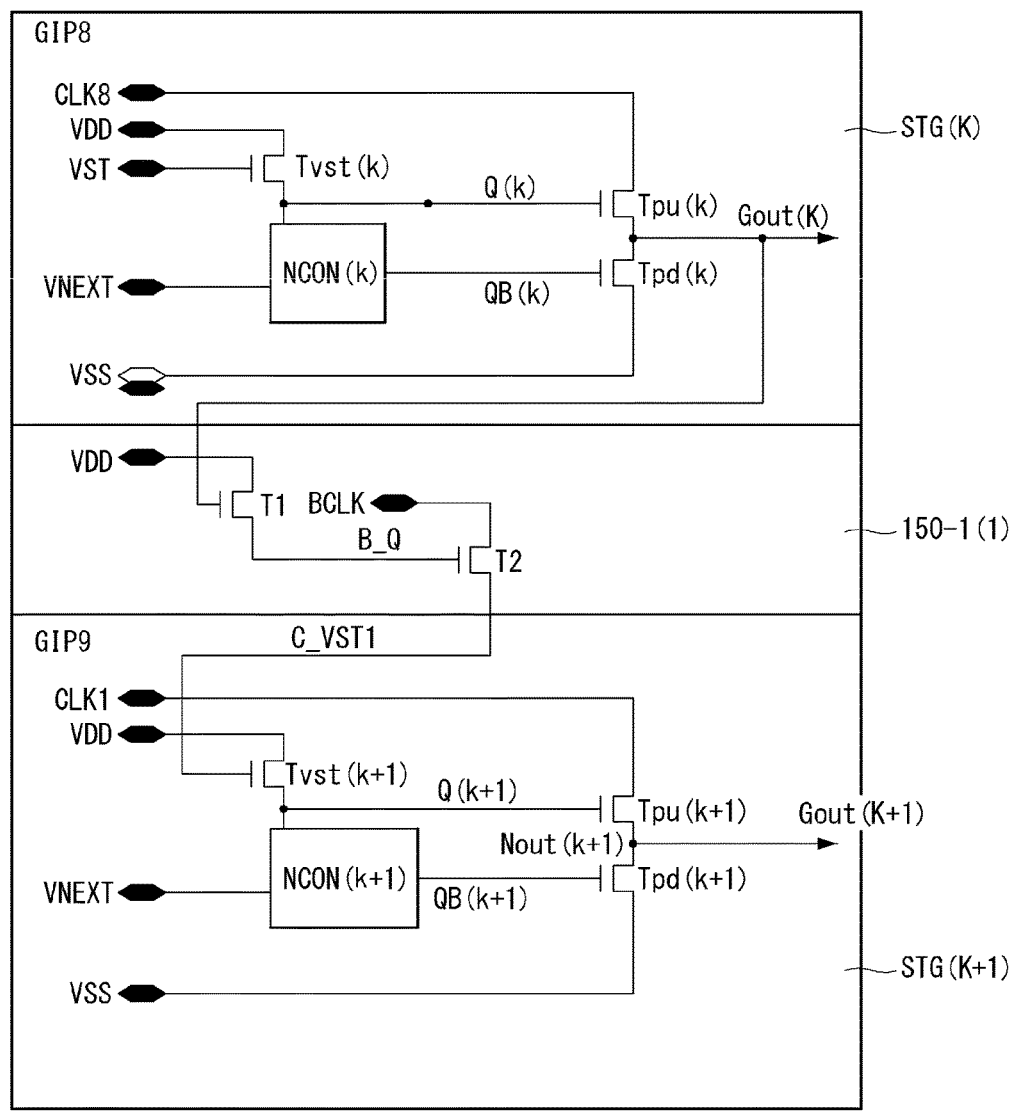
FIG. 12 is a view illustrating shift registers and a compensation stage, according to a second embodiment.
Figure 13:
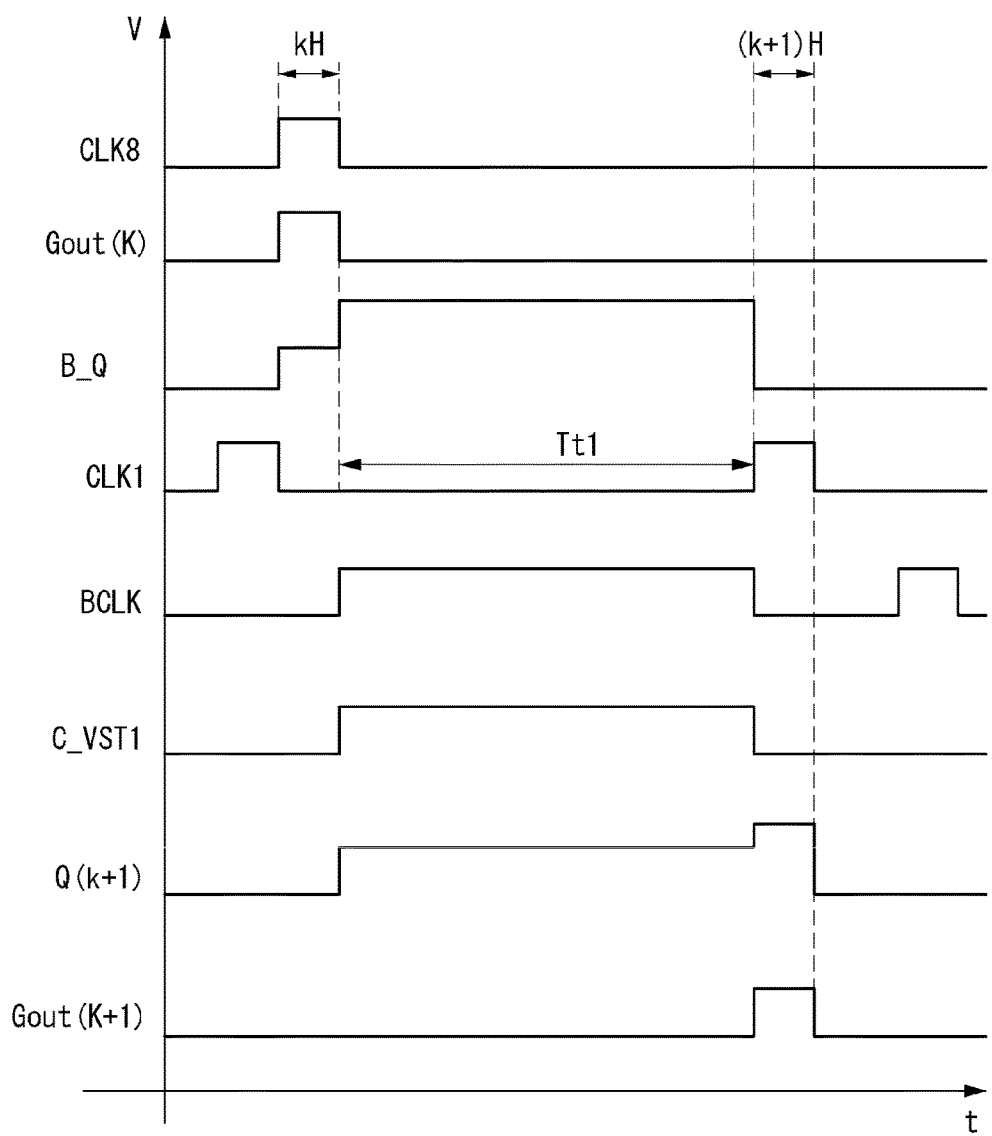
FIG. 13 is a timing diagram illustrating output signals of stages illustrated in FIG. 12, according to the second embodiment.

FIG. 12 is a view illustrating shift registers and a compensation stage, according to a second embodiment, and FIG. 13 is a timing diagram illustrating major node voltages of a shift register and a compensation stage, according to the second embodiment. The shift register according to the second embodiment may have the same configuration as that of the first embodiment and outputs a gate pulse through the same operation. Thus, detailed descriptions of a configuration and an operation of the shift register will be omitted.

A compensation stage and an operation thereof according to the second embodiment will be described with reference to FIGS. 12 and 13.

A first compensation circuit stage 150-1(1) includes a first transistor T1 and a second transistor T2.

The first transistor T1 includes a drain electrode connected to a high potential voltage VDD input terminal, a source electrode connected to a bridge Q node B_Q, and a gate electrode connected to an output terminal Gout(K) of a Kth stage STG(K). The second transistor T2 includes a drain electrode connected to a bridge clock BLCK input terminal, a source electrode connected to a start control transistor Tvst(k+1), and a gate electrode connected to the bridge Q node B_Q.

During a kth horizontal period kH, the Kth stage STG(K) outputs a gate pulse Gout(K). The first transistor T1 of the first compensation circuit stage 150-1(1) is turned on by the gate pulse Gout(K) to pre-charge the bridge Q node B_Q.

After the gate pulse Gout(K) is output, the first touch sensing period Tt1 during which the first panel block PB1 region is touch-driven follows as illustrated in FIG. 5.

During the first touch sensing period Tt1, the bridge clock BCLK maintains a high level voltage. As a result, during the first touch sensing period Tt1, the second transistor T2 is bootstrapped by the bridge clock BCLK so as to be turned on to output a first compensation start signal C_VST1.

The first compensation start signal C_VST1 is applied to the start control transistor Tvst(k+1). In response to the first compensation start signal C_VST1, the start control transistor Tvst(k+1) charges the Q node Q(k+1). As a result, the Q node Q(k+1) may maintain a high level voltage even during the first touch sensing period Tt1.

During the (k+1)th horizontal period (k+1)H, the (K+1)th stage STG(K+1) outputs a (K+1)th gate pulse Gout(K+1) in response to the first gate clock CLK1.

As discussed above, since the start control transistor Tvst(k+1) is operated by the first compensation start signal C_VST1, the Q node Q(k+1) may be charged during the first touch sensing period Tt1. That is, since the Q node Q(k+1) voltage is not discharged even during the first touch sensing period Tt1, the (K+1)th gate pulse Gout(K+1) may be output in response to the first clock signal CLK1.

The first compensation circuit stage 150-1(1) operates upon receiving a voltage of Gout(K).

In the first compensation stage 150(1) according to the first embodiment, the compensation transistor Tcom1 is connected to the Q node Q(k). As a result, the bridge clock BCLK applied to the compensation transistor Tcom1 changes a gate voltage of the compensation transistor Tcom1, and the change in the gate voltage of the compensation transistor Tcom1 affects a voltage of the Q node Q(k). That is, a variation of the voltage of the Q node Q(k) becomes unstable.

In contrast, since the first compensation circuit stage 150-1(1) according to the second embodiment is connected to the Gout(K), it does not affect a potential of the Q node Q(k).

As illustrated in FIG. 5, the aforementioned first and second embodiments relate to embodiments in which the bridge clock BCLK is output in the form of a square wave that has a low DC voltage level during the display periods Td, and a high DC voltage level during the touch sensing periods Tt.

Figure 14:
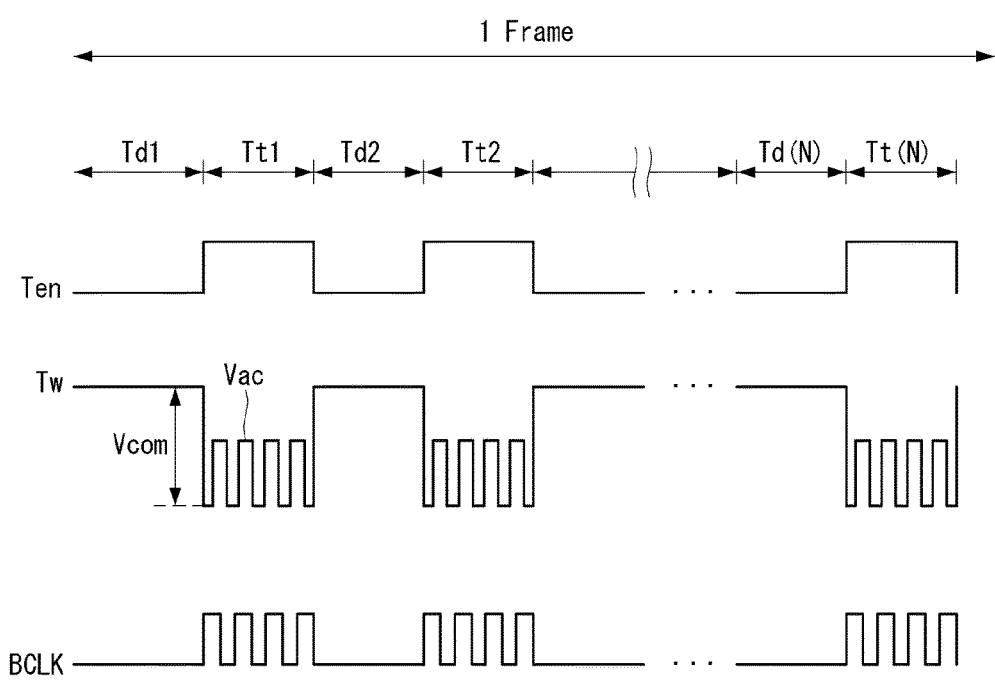
FIG. 14 is a view illustrating a driving signal, according to the second embodiment.

The bridge clock BCLK for driving the compensation stage of the present disclosure may also use an alternating current (AC) signal as illustrated in FIG. 14.

Figure 15:
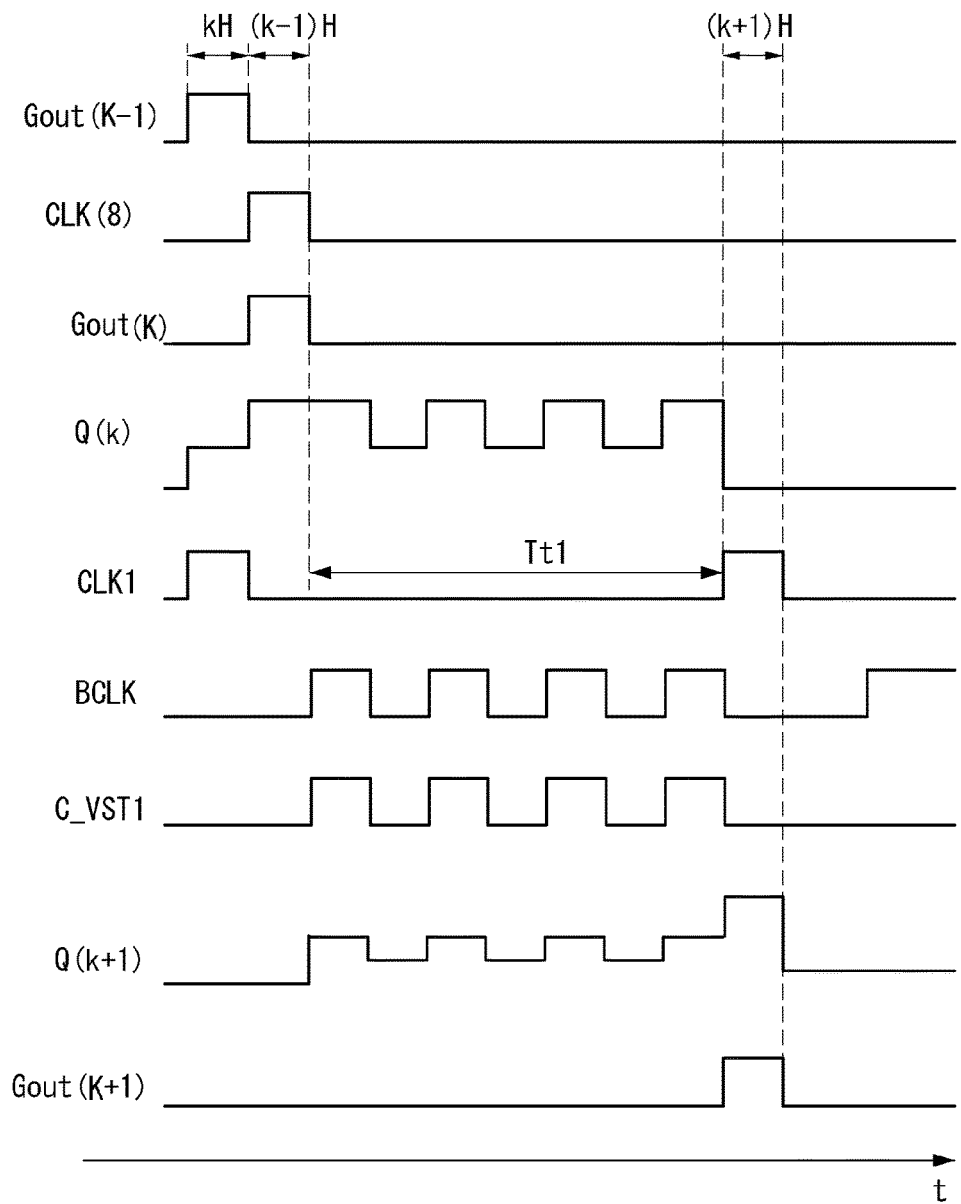
FIG. 15 is a timing diagram illustrating output signals when the stages illustrated in FIG. 8 are driven by using the driving signal illustrated in FIG. 14, according to an embodiment.

FIG. 15 is a view illustrating outputs of stages when the bridge clock BCLK illustrated in FIG. 14 is applied to the first embodiment illustrated in FIG. 8.

Figure 16:
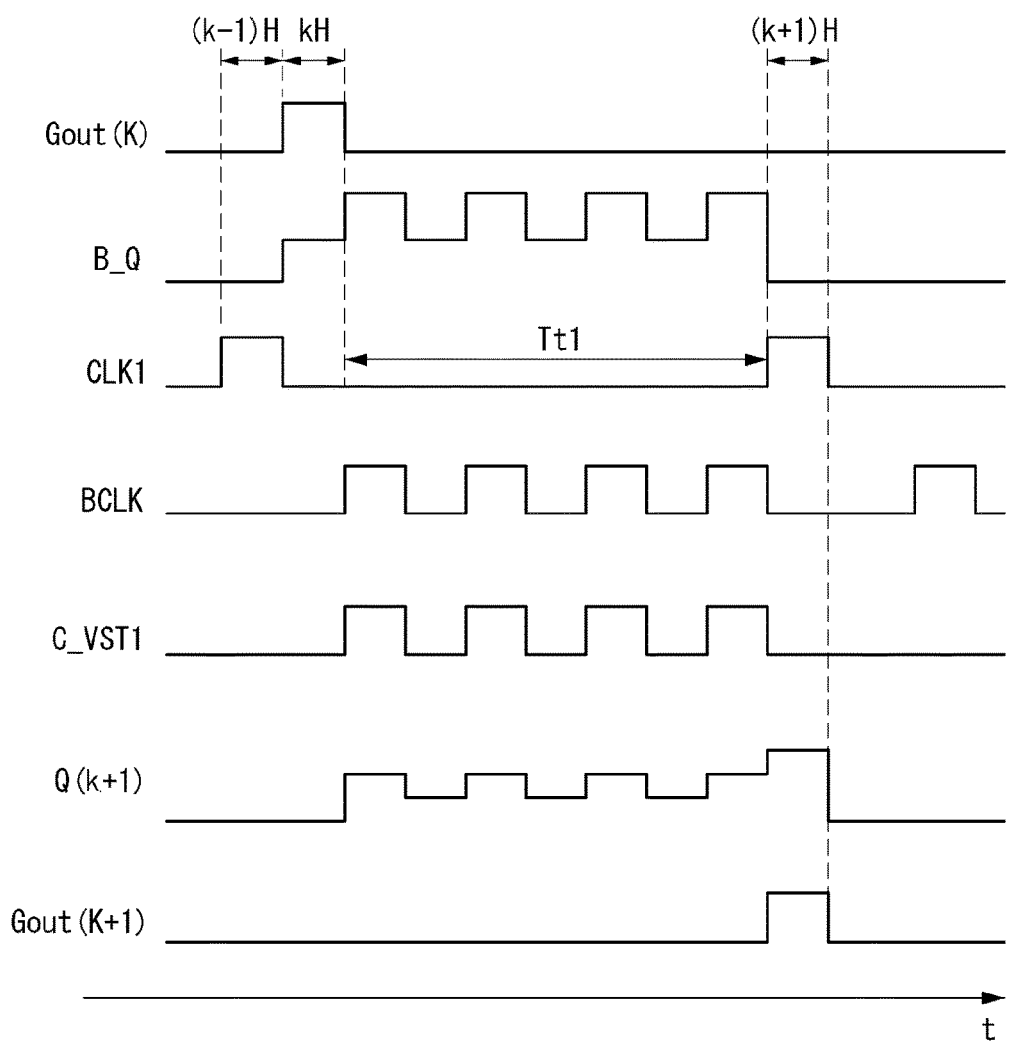
FIG. 16 is a timing diagram illustrating output signals when the stages illustrated in FIG. 12 are driven by using the driving signal illustrated in FIG. 14, according to an embodiment.

FIG. 16 is a view illustrating outputs of stages when the bridge clock BCLK illustrated in FIG. 14 is applied to the second embodiment illustrated in FIG. 12.

A third embodiment will be described with reference to FIGS. 8, 14, and 15. In the third embodiment, a configuration and an operational principle of the Kth and (K+1)th stages STG(K) and STG(K+1) and the first compensation circuit stage 150(1) are the same as those of the first embodiment described above, and thus, a detailed description thereof will be omitted.

During the first touch sensing period Tt1, the first compensation transistor Tcom1 receives the bridge clock BCLK, an AC signal. The Q node Q(k) bootstrapped during the kth horizontal period kH is bootstrapped by the bridge clock BCLK during the first touch sensing period Tt1. Since the bridge clock BCLK is input as an AC signal, a voltage of the Q node Q(k) is bootstrapped in a high level section D high and is not bootstrapped in a low level section D low. Thus, the first compensation start signal C_VST1 output by the first compensation transistor Tcom1 is output as a turn-on voltage in the high level section D high and output as a turn-off voltage in the low level section D low.

As a result, during the first touch sensing period Tt1, the start control transistor Tvst(k+1) is repeatedly turned on and off by the first compensation start signal C_VST1 such that the voltage of the Q node Q(k+1) is not discharged but maintained at a predetermined level. The start control transistor Tvst(k+1) is not always in the turned-on state during the first touch sensing period Tt1, it is less DC-stressed, compared with the first embodiment.

A fourth embodiment will be described with reference to FIGS. 12, 14, and 16. In the fourth embodiment, a configuration and an operational principle of the Kth and (K+1)th stages STG(K) and STG(K+1) and the first compensation circuit stage 150-1(1) are the same as those of the second embodiment described above, and thus, a detailed description thereof will be omitted.

During the first touch sensing period Tt1, the second transistor T2 receives the bridge clock BCLK, an AC signal. The Q node B_Q bootstrapped during the kth horizontal period kH is bootstrapped by the bridge clock BCLK during the first touch sensing period Tt1. Since the bridge clock BCLK is input as an AC signal, a voltage of the Q node B_Q is bootstrapped in a high level section D high and is not bootstrapped in a low level section D low. Thus, the first compensation start signal C_VST1 output by the second compensation transistor T2 is output as a turn-on voltage in the high level section D high and output as a turn-off voltage in the low level section D low.

As a result, during the first touch sensing period Tt1, the start control transistor Tvst(k+1) is repeatedly turned on and off by the first compensation start signal C_VST1 such that the voltage of the Q node Q(k+1) is not discharged but maintained at a predetermined level. That is, in the fourth embodiment, DC stress of the start control transistor Tvst(k+1) may be reduced.

In the present disclosure, in the display device in which display periods and touch sensing periods are repeated by panel blocks, the Q node is prevented from being decayed during the touch sensing period. Thus, in the present disclosure, a phenomenon in which the Q node is decayed so a gate pulse is not smoothly output can be prevented.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel including first and second panel blocks each including pixel arrays including touch sensors;
a display driving circuit writing image data to pixels of the first panel block during a first display period and writing image data to pixels of the second panel block during a second display period; and
a touch sensing circuit driving the touch sensors of the first panel block during a first touch sensing period and driving the touch sensors of the second panel block during a second touch sensing period,
wherein the display driving circuit comprises:
a shift register sequentially outputting a gate pulse applied to a gate line, the shift register comprising:
a first shift register applying a first gate pulse to first gate lines arranged in the first panel block, the first shift register including a first Q node;
a second shift register applying a second gate pulse to second gate lines arranged in the second panel block, the second shift register applying the second gate pulse to a gate line of the second gate lines during at least a portion of the second display period when a second Q node of the second shift register is charged to a predetermined level; and
a compensation circuit stage applied with a bridge clock during the first touch sensing period to charge the second Q node of the second shift register responsive to the bridge clock during the first touch sensing period, the compensation circuit stage including:
a compensation transistor including a gate electrode connected to the first Q node of the first shift register and a drain electrode receiving the bridge clock.

2. The display device of claim 1,
wherein the first shift register includes first to Kth stages outputting K number of gate pulses, and the second shift register includes (K+1)th to 2Kth stages, where K is a natural number,
wherein each of the first to 2Kth stages comprise:
a pull-up transistor including a first gate electrode connected to a node, a first drain electrode connected to a gate clock input terminal, and a first source electrode connected to a gate pulse output terminal; and
a start signal transistor including a second gate electrode connected to a start signal input terminal, a second drain electrode connected to a high potential voltage input terminal, and a second source electrode connected to the node, and
wherein the compensation circuit stage charges a node of the (K+1)th stage of the second shift register after a gate pulse is output from the Kth stage of the first shift register.

3. The display device of claim 2,
wherein a start control transistor of the Kth stage of the first shift register charges the node of the Kth stage of the first shift register in response to a gate pulse output by a (K−1)th stage of the first shift register, and
wherein the compensation transistor is turned on when the node of the Kth stage of the first shift register is charged, to output the bridge clock as a compensation start signal.

4. The display device of claim 3, wherein the bridge clock bootstraps the node of the Kth stage of the first shift register during the first touch sensing period to cause the compensation transistor to output the compensation start signal during the first touch sensing period.

5. The display device of claim 4, wherein the bridge clock is applied as an alternating current (AC) waveform to the compensation transistor during the first touch sensing period, the compensation transistor outputs the compensation start signal for AC-driving the start control transistor of the (K+1)th stage of the second shift register during the first touch sensing period.

6. A touch sensitive display device, comprising:
a display panel driven in a first display period, a second display period, and a touch sensing period between the first display period and the second display period, the display panel including a first plurality of gate lines and a second plurality of gate lines; and
a shift register to drive the first plurality of gate lines and the second plurality of gate lines, the shift register comprising:
a first shift register to sequentially apply a gate pulse to the first plurality of gate lines of the display panel during the first display period, the first shift register including a first Q node;
a second shift register to sequentially apply an additional gate pulse to the second plurality of gate lines of the display panel during the second display period, the second shift register applying the additional gate pulse to a gate line of the second gate lines responsive to a second Q node of the second shift register being charged to a predetermined level; and
a compensation circuit applied with a bridge clock during the touch sensing period to charge to charge the second Q node of the second shift register during the touch sensing period between the first display period and the second display period, the compensation circuit charging the given node further in response to a signal from the first shift register, the compensation circuit stage including:
a compensation transistor including a gate electrode connected to the first Q node of the first shift register and a drain electrode receiving the bridge clock.

7. The touch sensitive display device of claim 6, wherein the compensation circuit maintains a voltage of the second Q node of the second shift register during the touch sensing period.

8. The touch sensitive display device of claim 6,
wherein the first shift register includes first to Kth stages, the second shift register includes (K+1)th to 2Kth stages, where K is a natural number, and
wherein each of the first to 2Kth stages comprise:
a pull-up transistor including a first gate electrode connected to a node, a first electrode connected to a gate clock input terminal, and a second electrode connected to a gate pulse output terminal; and a start control transistor including a second gate electrode connected to a start signal input terminal, a third electrode connected to a high potential voltage input terminal, and a fourth electrode connected to the node.

9. The touch sensitive display device of claim 8, wherein the compensation circuit charges the second Q node of the second shift register in response to a signal from the first shift register by charging the node of the (K+1)th stage of the second shift register responsive to a charge at the node of the Kth stage of the first shift register.

10. The touch sensitive display device of claim 8, wherein the compensation circuit charges the second Q node of the second shift register in response to a signal from the first shift register by charging the node of the (K+1)th stage of the second shift register responsive to the gate pulse output from the Kth stage of the first shift register.

11. The touch sensitive display device of claim 6, wherein the bridge clock is an alternating current (AC) waveform during the touch sensing period.

12. The touch sensitive display device of claim 6, wherein the bridge clock has a first DC voltage level during the first display period and the second display period, and has a second DC voltage level during the touch sensing period.

13. The touch sensitive display device of claim 6, wherein the bridge clock bootstraps the second Q node of the second shift register during the touch sensing period to cause the compensation circuit to output a compensation start signal during the touch sensing period.

14. The display device of claim 1, wherein the bridge clock has a first DC voltage level during the first display period and the second display period, and has a second DC voltage level during the first touch sensing period.

15. The display device of claim 1, wherein the first Q node is coupled to a first gate electrode of a first pull-up transistor connected to a first output node applying the first gate pulse, and wherein the second Q node is coupled to a second gate electrode connected to a second pull-up transistor of a second output node applying the second gate pulse.

16. The touch sensitive display device of claim 6, wherein the first Q node is coupled to a first gate electrode of a first pull-up transistor connected to a first output node applying the gate pulse, and wherein the second Q node is coupled to a second gate electrode connected to a second pull-up transistor of a second output node applying the additional gate pulse.

* * * * *